Nov. 23, 1937.  R. C. TODD  2,099,778
HINGED STRUCTURE
Filed Aug. 5, 1936  2 Sheets-Sheet 1

INVENTOR.
Ralph Clayton Todd.
BY
His ATTORNEYS.

Nov. 23, 1937.      R. C. TODD      2,099,778
HINGED STRUCTURE
Filed Aug. 5, 1936      2 Sheets-Sheet 2

INVENTOR.
Ralph Clayton Todd.
BY Slough and Caulfied
His ATTORNEYs.

Patented Nov. 23, 1937

2,099,778

UNITED STATES PATENT OFFICE 2,099,778

HINGED STRUCTURE

Ralph Clayton Todd, Elyria, Ohio

Application August 5, 1936, Serial No. 94,427

5 Claims. (Cl. 296—44)

This invention relates to hinged structures, and more particularly to hinged structures having curved surfaces at the hinging zone.

Heretofore, doors having curved or outwardly bulging surfaces have been hinged to supports having similarly curved surfaces, a common example of this construction being doors of automotive vehicles. The hinges for a curved automobile or the like door are disposed externally of the door and are usually three in number the hinge pintles having a common vertical axis and the hinge length being dependent on the distance of the door surface from such axis. I am also familiar with hinge constructions adapted to a curved door or the like having angularly disposed pintles or having a combination sliding and hinging movement. However, all of these prior constructions require the hinge to be disposed externally of the door which prevents the door trim from covering the hinge area, the hinges are continuously exposed to the elements, and the externally disposed hinges are highly undesirable from an appearance standpoint on modern cars.

I have devised an improved hinge arrangement adapted to curved doors on automotive vehicles and the like wherein the hinges are internally disposed or hidden and yet which is of relatively simple construction.

It is a primary object of my invention to provide a hidden hinge construction for curved doors on automobiles and the like.

Another object of my invention is to provide a hidden hinge construction for automobile and the like doors whereby the door trim may be extended completely around the door periphery providing greater protection from the elements.

Another object of my invention is to provide a hidden hinge construction for curved automobile and the like doors thereby improving the appearance of the car.

Another object of my invention is to provide a hinge construction of the above type which is relatively simple to manufacture and install.

Other objects of my invention and the invention itself will become increasingly apparent from a consideration of the following description and drawings wherein.

Figure 1:
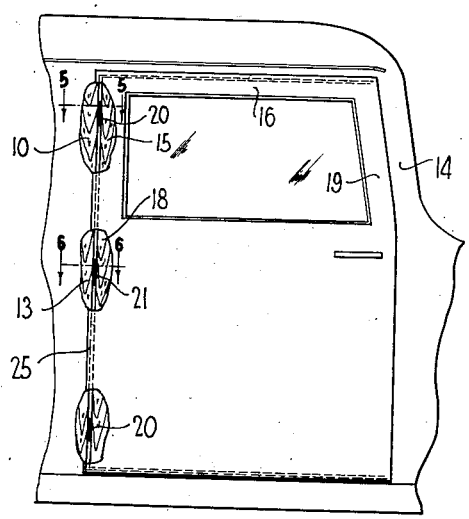
Fig. 1 is a fragmentary elevational view of an automobile door and frame embodying my invention.
Figure 5:
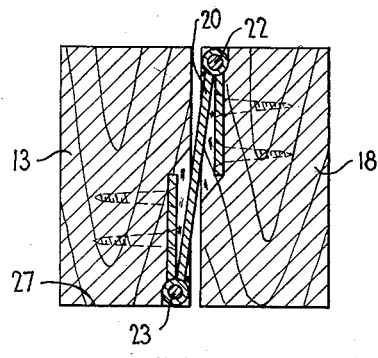
Figure 6:
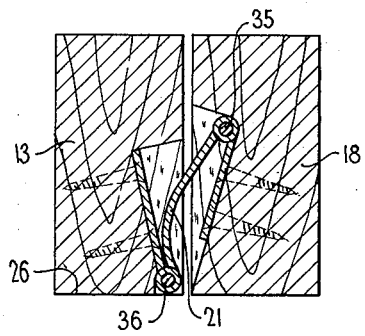
Figure 8:
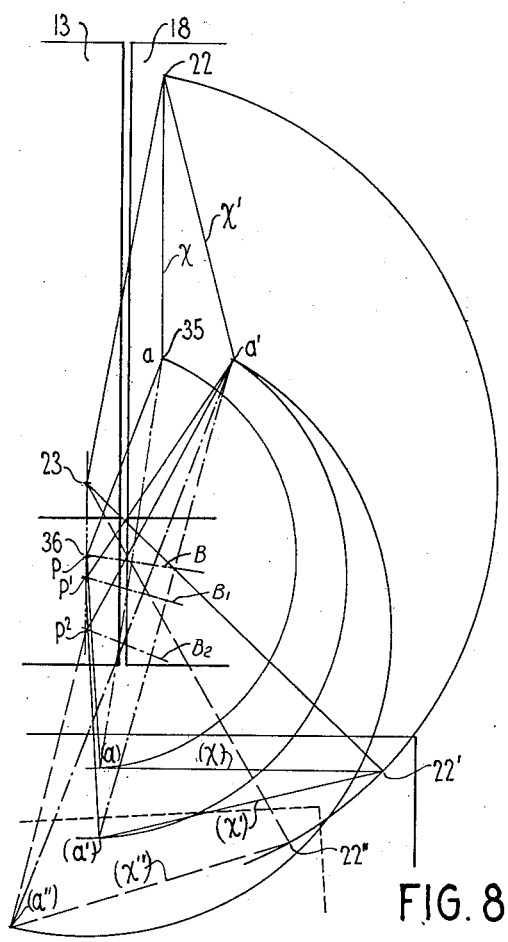
Figure 7:
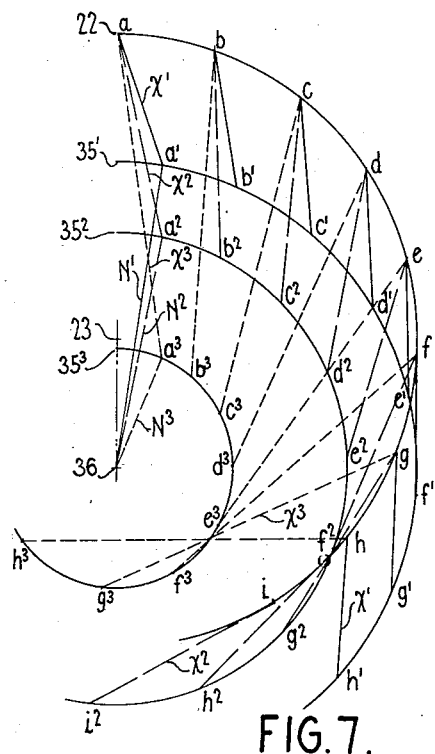

Figs. 5 and 6 are sections taken along the lines 5—5 and 6—6 respectively of Fig. 1;

Fig. 7 is a diagrammatic chart showing the effect of hinges of varying length between pintles, and Fig. 8 is another diagrammatic chart showing the effect of varying the location of a middle or lower hinge which I employ.

Figure 2:
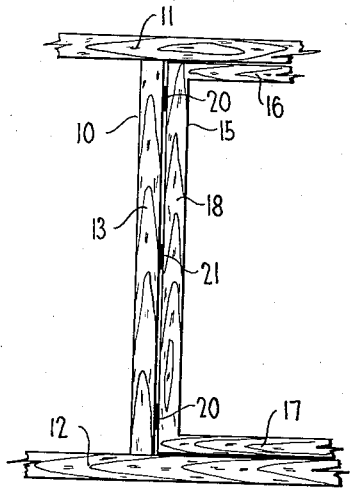
Fig. 2 is an elevational view generally similar to Fig. 1 showing the vehicle frame and the door frame in skeleton form.
Figure 3:
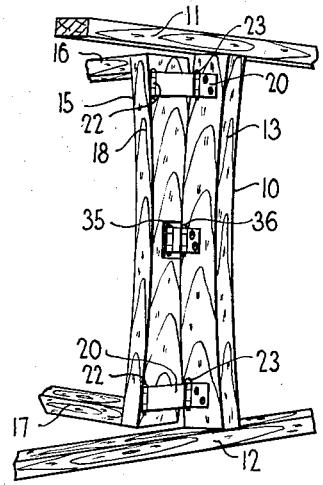
Fig. 3 is a perspective view of the structure of Fig. 2 with the door frame in open position.

Referring now to the drawings and particularly Figs. 1-3 inclusive, I have indicated generally at 10 a frame structure generally rectangular in form comprising rectilinear top and bottom frame members 11 and 12 and curved vertically extending side members 13 and 14. For purposes of illustration, I have shown the frame 10 incorporated in an automobile body but it is understood that my invention is applicable to any construction wherein it is desired to support a curved door within a frame having curved members.

The door frame generally indicated at 15 is also generally rectangular in form comprising top and bottom rectilinear frame members 16 and 17 respectively and curved side frame members 18 and 19, the curvature of the door side frame members 18 and 19 preferably conforming generally in curvature to the body side frame members 13 and 14.

Figure 4:
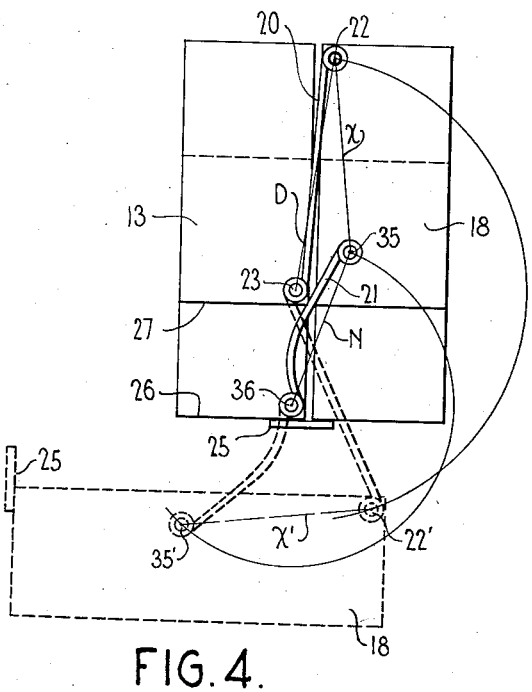
Fig. 4 is a diagrammatic plan view of the structure of Fig. 2.

The door frame 15 is pivotally secured to the body frame 10 by top and bottom hinges 20—20 and an intermediate hinge 21 disposed in the zone of maximum curvature. The hinges 20 and 21 are of the double pintle type with the pintle axes in parallel relation. Referring to Fig. 4 I have illustrated in plan view and partially diagrammatically the relation of the vehicle frame member 13 and the door frame member 18 and the relative disposition of the hinges. Inasmuch as the upper and lower hinges 20 are identical in construction and operation it is only necessary to consider the relation of the upper hinge 20 and the intermediate hinge 21. The hinges are secured by the usual straps to the wood frame but it is understood that they can be also secured to a metal frame in a suitable manner as by welding. The pintle of hinge 20 associated with the door frame 18 is indicated at 22 and the pintle associated with the body or vehicle frame member 13 is indicated at 23, the distance between the pintles 22 and 23 and the amount which the pintles are set into the frame members 13 and 18 being determined by several factors. First, the clearance between the frame members 13 and 18 with the door in a closed position must be determined within practical limits and which may be a distance such as ⅛". If too small a clearance is provided, there is danger of binding due to temperature changes, slight adjustments of the body frame and door, and other similar reasons. Also, it is undesirable to have any greater clearance than necessary since this adds to the difficulty of effecting a tight weather seal and the danger of a person having their fingers pinched is considerably increased. Therefore, a desired and practical clearance will be determined and pintles 22 and 23 will preferably be set into their respective frame members sufficiently to be hidden rather than exposed and so as not to interfere with the confronting faces of the frame members 13 and 18 being positioned as closely together as practical. For convenience, it may be assumed that the pintles 22 and 23 are inset from the confronting faces of the frame members to which they are secured approximately ½".

The distance between pintles 22 and 23 or the length of the hasp has been indicated as D, this distance being determined by the depth of the frame member 13, the clearance desired between members 13 and 18 in closed and open position of the door, and the amount of outward bulge or curvature of the frame members 13 and 18. It is apparent that the length D can be arbitrarily determined consistent with the above requirements. As the door frame member 18 is revolved from closed to open position, the pintle 22 will revolve about pintle axis 23 as a center to some position such as 22', the position 22' being dependent on the clearance desired between the member 18 in open position and the vehicle or the like body and a greater clearance will necessitate increased revolution. The point 22' can be determined therefore, without consideration of the intermediate hinge 21. However, it is apparent that for any relatively revolved position of pintle 22 in its path that the frame member 18 may assume a plurality of positions by revolving about pintle 22 as an axis if not constrained to a definite position by the provision of hinge 21. The amount of trim or weather stripping 25 around the door periphery will be a factor in determining the clearance required with door in open position.

The intermediate hinge 21 is also provided with parallel double pintles indicated at 35 and 36, the hinge length or the distance between the pintles being indicated as N. It will be observed that the distance between the pintle 22 of hinge 20 and of pintle 35 of hinge 21 will always remain a constant since both pintles 22 and 35 are affixed to door frame member 18, the line joining these pintle axes being indicated at X, and the position of this line X as the pintles 22 and 35 revolve around their respective path will determine the revolved position of the door frame.

Referring to Fig. 7, the center of revolution of pintle 22 is indicated at 23 and successive revolved positions of pintle 22 in its path of revolution are indicated at a, b, c, etc., the point i corresponding with the position 22' of Fig. 4 indicating a desired clearance position with the door open. Points a', b', c', etc., indicate successive revolved positions of the pintle 35 in its path of revolution about pintle 36 and with the distance N' approximately equal to D. The distance X in this case is indicated at X' and the various positions of line X' will determine the position of door frame member 18 in corresponding positions, the distance X' remaining constant. It will be observed by noting the position of X' at h that its angularity has changed relatively little and that although the door frame moves outwardly from the body frame that the door opening movement is small and insufficient to permit access to the vehicle.

The points a3, b3, c3, etc., indicate successive revolved positions of pintle 35 about pintle 36 when the distance N is substantially equal to the curvature or distance between lines 26 and 27. It will be noted that with the length N reduced to this degree that in the position g, the frame member 18 cannot open due to interference with the corner of the body frame member 13 thereby limiting opening movement of the door.

Thus, if the length N of the intermediate hinge 21 is increased or decreased beyond definite limits relative to length D of the hinge 20, the door cannot function as desired.

Points a2, b2, c2, etc., represent revolved positions of pintle 35 with the length N an intermediate value and it will be noted that the line X' assumes substantially the same relative position as in Fig. 4 permitting the door to open as desired and with proper clearance.

An analysis of these charts indicates that N must be greater than the amount of curvature, and preferably ½D or greater, but less than D. It will be noted that the distance X is determined by the position of points a1, a2, a3, or by the length N and that N will be a substantially satisfactory length if X is ½D or greater than ½D but less than D.

Referring to Fig. 8, I have shown a chart illustrating how the positions of pintles 35 and 36 of the intermediate hinge 21 may be varied to provide varying clearances, particularly in open position of the door. The points a and a' are arbitrarily determined by the distances X and X' taken within the above limits and determined by the amount of inset from the face of frame member 18 desired for pintle 35. The points 22' and 22" are determined by the clearance desired with the door in open position. That is, the pintle 22 will be revolved to position 22' to provide substantially the amount of clearance shown in Fig. 4 between the outer curved face 26 of body frame member 13 and the revolved frame member 18. If a greater clearance is desired the pintle must be revolved through a greater number of degrees to a position as at 22".

The position of pintle 36 may be orbitrarily chosen within the above limits as indicated at P, P1 and P2 and since the point a is at a constant distance X from 22', a line intersecting the path of revolution of point a at a distance X from point 22' will determine the revolved position (a) (a'). The points (a) and (a') therefore can be determined by the revolved position of lines X and X' and a line joining the closed and revolved position of points a—(a) and a'—(a') can be bisected perpendicularly, the perpendicular bisectors being indicated at B, B' and B3. The center of rotation of pintle 35 or the location of pintle 36 will be on the lines, B, B1 and B2 and the specific location thereon will be determined by the amount of inset from the face of frame member 13 desired which in the example is the same as a pintle 23. In other words, if it is desired to inset pintle 36 a greater distance from the face of frame member 13, this can be done without altering the revolved position of frame member 18 as long as the pintle 36 is moved along the perpendicular bisector of the line joining a—(a), the only effect being to increase the distance between pintles 35 and 36.

If pintle 35 is desired to be inset to the position a' and pintle 36 is arbitrarily disposed at a position P, the position (a') revolved will be determined as hereinbefore described. It will be noted that the position of frame member 18 in revolved position is substantially the same as determined by the revolved position of points (a) and (a').

The point 22" represents a greater degree of clearance with the position of pintle 35 remaining fixed relative to frame member 18 or at a'. P2 is arbitrarily chosen and the revolved position of frame member is determined by the line (X"). Therefore, the length and disposition of the intermediate hinge can be accurately determined to satisfy varying requirements on curved surface doors and securing frames.

Although I have shown and described a preferred embodiment of my invention, it is understood that numerous and extensive departures may be made therefrom without departing from the spirit of my invention and the scope of the appended claims.

Having thus described my invention what I claim is:

1. The combination with a longitudinally outwardly curved support and a generally similarly curved support element, of hinges interconnecting the support and element at longitudinally spaced points, each of said hinges being of double pintle construction with parallel axes, one of said hinges being disposed adjacent an end portion of the supported element with one pintle axis adjacent the inner face of the element and the other pintle axis adjacent the outer face of the support, a second hinge disposed in the zone of maximum curvature of the element, the distance between the pintle axes of the second hinge being less than said distance for the first hinge, the distance between the axis of the pintle of the first hinge secured to the element and the axis of the pintle of the second hinge secured to the element being less than the distance between axes of the first hinge pintles but greater than one-half such distance, and the other pintle of the second hinge being secured to the support so that its axis falls on the perpendicular bisector of a line joining the position of the second hinge pintle secured to the element with the element parallel to the support and the position of said pintle after the element is revolved through 90°.

2. The combination with a generally rectangular supporting frame having an outwardly curved frame member, a generally rectangular supported frame having a generally similarly curved frame member adjacent the curved member of the supporting frame, of a hinge of the double parallel pintle type having one pintle secured adjacent the inner face of the supported frame member and the other pintle secured adjacent the outer face of the frame member of the supporting frame, a second hinge of the double parallel pintle type having one pintle secured adjacent the outer face of the frame member of the supporting frame at the zone of greatest curvature, and the other pintle secured to the supported frame member at a point intermediate the inner and outer faces, and the distance between the pintle axes of the second hinge being less than the distance between the pintle axes of the first hinge but greater than one-half such distance.

3. The combination of a supporting member longitudinally outwardly curved, a supported element generally similarly curved adapted to be disposed closely adjacent and generally parallel to the supporting member, hinges interconnecting the member and element at longitudinally spaced points, each of said hinges being of the double pintle type with parallel axes with one pintle secured to the member and the other to the element, one hinge being disposed adjacent an end portion of the element with one pintle secured adjacent the outer face of the member and the other pintle secured adjacent the inner face of the element, a second hinge disposed in the zone of greatest curvature with the distance between the pintle axes of the second hinge being less than the distance between axes of the first hinge and greater than one-half such distance, one of said pintles of the second hinge being secured to the member adjacent the outer face thereof, the other pintle being secured to the element so that the distance between pintle axes of the pintles of the first and second hinge secured to the element is less than the distance between pintle axes of the first hinge but greater than one-half said distance.

4. The combination as set forth in claim 3, and wherein the pintles are set in the confronting faces of the member and element, with the pintle of the second hinge which is secured to the element being set in a greater distance from the element face than the other pintles.

5. The combination with an outwardly curved support member of a vehicle and an outwardly curved vehicle door, of hinges interconnecting the support member and door at spaced points, each of said hinges being of double pintle construction with each pintle having an independent axis parallel to the axes of the other pintles, one hinge being disposed adjacent an end of the door with one pintle secured to the support member adjacent its outer face and the other pintle secured to the door adjacent its inner face, a second hinge disposed in the zone of maximum outward curvature of the door with one pintle secured to the door so that the distance between the axes of the first and second hinges secured to the door is greater than one-half the distance between the pintle axes of the first hinge but less than said distance, and the other pintle of the second hinge being secured to the support member with its axis on the perpendicular bisector of a line joining the position of the second hinge pintle secured to the door with the door in closed position and after being revolved through 90°.

RALPH CLAYTON TODD.